United States Patent Office 3,157,203
Patented Nov. 17, 1964

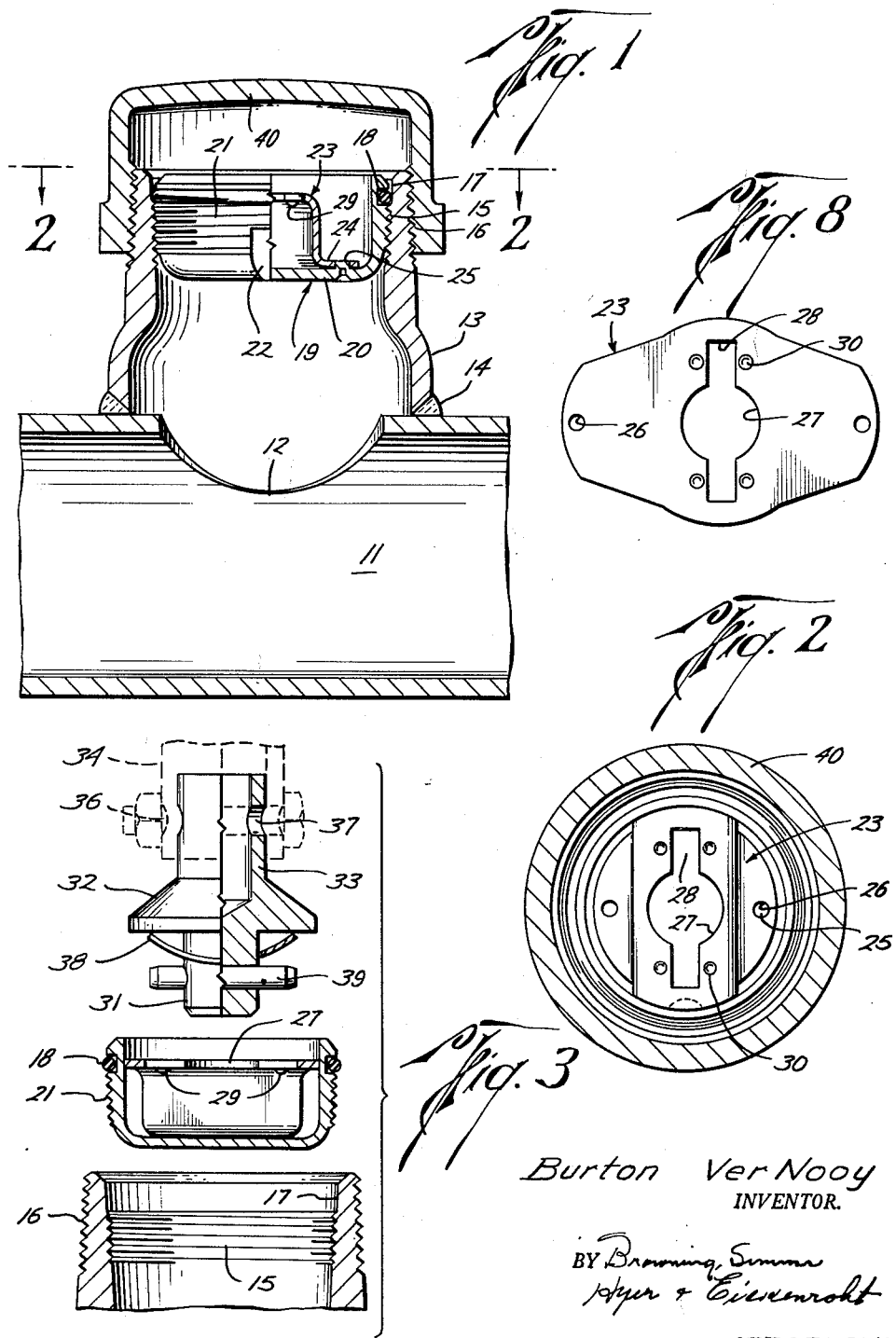

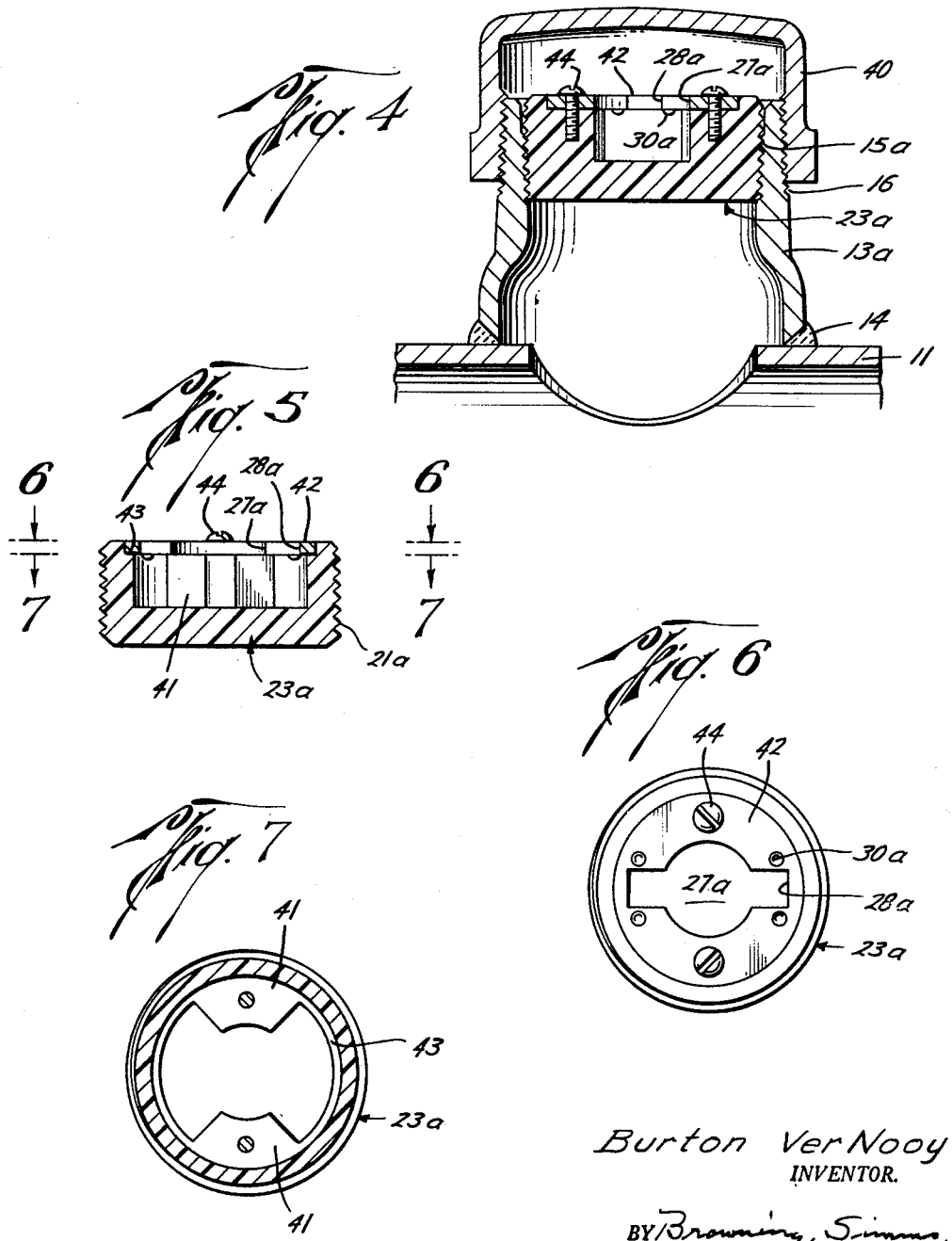

3,157,203
APPARATUS FOR CLOSING SIDE OPENINGS IN PIPELINES
Burton Ver Nooy, Tulsa, Okla., assignor to T. D. Williamson, Inc., Tulsa, Okla.
Filed May 9, 1961, Ser. No. 108,934
5 Claims. (Cl. 138—89)

This invention relates to improved fittings for closing side openings in pipelines.

In pipeline operation, it frequently happens that a line will develop a leak or a section of the line will become so corroded that it should be replaced. Repairs or replacement of line sections usually are accomplished by cutting into the line by "hot tapping," a term applied to opening the line while fluid is maintained under pressure therein. It is conventional to hot tap into a pipeline on either side of a leak or a section to be repaired and then to install a bypass loop of line around the section.

This process usually is accomplished by welding a split T or nipple to the pipeline on either side of the section to be replaced, attaching a valve to the nipple and mounting a hot tapping machine on the valve. The valve is opened and the tapping machine is operated to cut a side opening in the pipeline. The valve is then closed, the tapping machine is dismounted, and a suitable plugger is attached to the valve to plug the pipeline at a side of the lateral opening toward the section to be repaired. A bypass loop of pipe is connected through the nipples to the side openings of the pipeline on each side of the section to be repaired, and the plugged off section is cut out. Service is thus maintained through the bypass loop while the repairs are made. Later, when the repairs have been made and the bypass loop is to be removed, it is necessary to plug the side openings into the pipeline.

It is an object of this invention to provide apparatus for closing a side opening into a pipeline which is particularly adapted for use with pipelines operating at low pressure, especially lines of smaller size. Apparatus of this type finds special application in municipal gas and water distribution systems where apparatus of similar type has not been widely used because of the size, weight and cost of former devices. However, the apparatus of the present invention may also be used in pipelines of larger size and operating at higher pressures than are normally used in municipal distribution lines.

Another object is to provide improved apparatus for closing a side opening into a pipeline which is simplified in design and can be manufactured economically.

Another object is to provide a novel plug and holder cooperating to close a nipple and which may be landed on a nipple from a sealed chamber while pressure is maintained on the line.

Another object is to provide an assembly of nipple, plug and holder of improved design enabling quick and easy closure of side openings into pipelines.

Still another object is to provide a side closure for a side line which is very compact, short in length, light in weight and permanent, in that it is not subject to rapid deterioration by corrosion.

Other objects and advantages will become apparent to those skilled in the art from the following disclosure and consideration of the attached drawings.

In the present invention a nipple is provided having an end shaped to fit upon and be welded to a pipeline in leakproof relationship therewith so that the bore of the nipple communicates with the side opening into the pipeline. This nipple has a substantially cylindrical bore and is internally threaded on at least a part of the bore. The nipple also should be threaded on the outside to provide attachment for a tapping valve and for a cap when the tapping valve has been removed. The bore of the nipple is substantially cylindrical although the threaded portion may be tapered slightly as it approaches the direction of the pipeline for a purpose that will be described later.

A hollow, substantially cylindrical plug having a closed bottom and threaded externally on at least a part of its surface is provided to be screwed into the threaded section of the bore of the nipple. The plug has at least a part of its exterior surface formed from a resilient material, and a surface of this resilient material cooperates with a surface on the bore of the nipple to form a fluid-tight seal.

The hollow plug has a plate extending across its interior with at least a central part of the plate spaced from the bottom of the body. This plate has an opening through it at the central part where it is spaced from the bottom of the plug. The opening has a substantially circular portion coaxial with the plug and has lateral extensions of width less than the diameter of the circular portion of the opening, preferably arranged diametrically opposite each other. Beneath the plate in the plug a means for engaging a holder is disposed to cooperate with a special type holder to rotate the plug into or out of the nipple.

This plug holder has a cylindrical body sized to fit loosely into the circular central portion of the opening in the plate and has a shoulder projecting outward from the body having lateral dimensions greater than the diameter of the circular portion of the opening. The holder body also has a noncylindrical extension above the shoulder shaped to fit into a detachable handle which preferably is of snap-on type having detents to be engaged by depressions in the noncircular portion of the holder body. The handle, if desired, may be of sufficient length to permit its insertion into a sealed chamber attached to a tapping valve, through an annular seal in a wall of the chamber, and to permit manipulation of the holder and plug inside a chamber of this type from a point outside the chamber.

The holder body carries a resilient means, preferably a spring, and, in the most preferred form, a spring washer or Belleville spring in position to force the body upward on application of pressure upon the spring. A crossbar is carried by the holder body at a level just below that of the resilient member and of such size that the crossbar will enter freely through the lateral extensions of the opening in the plate.

It will thus be seen that when a holder of this type is introduced into the opening of the plate and the body is forced downward far enough for the crossbar to be below the lower side of the plate, pressure from the plate upon the resilient member tends to force the body upward, thus drawing the crossbar into firm contact with the underside of the plate, on rotation of the body, and the crossbar will engage the holder engaging means located on the lower side of the plate.

A plug can thus quickly be seated in sealing position by rotation of the holder driven by a suitable detachable handle and the seal is quickly made without permitting escape of a substantial amount of fluid from the line. It will be seen that the above assembly is one that is very light in weight, very compact, cheap and economical in construction; and when the plug is driven firmly into place and covered by a cap protecting the exterior threads on the nipple, it is protected against corrosion from soil water or other environmental factors.

In the attached drawings, wherein like characters are used throughout to designate like parts:

FIG. 1 illustrates in vertical section a pipeline having a lateral opening therein having one preferred type of nipple, plug and cap of the present invention attached thereto;

FIG. 2 is a cross section of the device of FIG. 1 on the line 2—2;

FIG. 3 is an exploded sectional view of the upper part of a nipple of FIG. 1, the plug of FIG. 1 rotated 90° and a holder, illustrating cooperation of the holder, plug, nipple and handle;

FIG. 4 is a vertical section through a modification of the nipple and plug of this invention particularly desirable when the plug is formed of a slightly compressible plastic material;

FIG. 5 is a section through the plug of FIG. 4 showing its external configuration when not screwed into the nipple;

FIG. 6 is a plan of the plug of FIG. 5;

FIG. 7 is a cross section through the plug of FIG. 5 on the line 7—7; and

FIG. 8 is an outline of a flat metal plate stamped to form the plate of FIGS. 1, 2 and 3.

In FIG. 1, the reference numeral 11 indicates a pipeline having a lateral opening 12 therein. A nipple 13 is shaped to fit upon the exterior of the pipeline around opening 12 and is attached thereto in fluid-tight relationship by suitable attachment means illustrated as a weld 14. Nipple 13 has interior threads 15 and exterior threads 16 on a portion of its length. Nipple 13 also has a smooth cylindrical surface 17 surrounding the central bore thereof and adapted to cooperate with an external surface of a ring of resilient material, illustrated as an O-ring 18 on a plug designated generally as 19.

The plug 19 is of hollow, cylindrical shape having a closed bottom 20 and is threaded on its exterior side with threads 21 matching the interior threads 15 on nipple 13. Plug 19 preferably has a depression therein at 22 formed by cutting away a part of the plug body including a few of the innermost threads, but not extending through the plug body to communicate with the interior thereof. This depression permits the lowermost threads 21 to sweep cuttings, dirt and foreign material out of threads 15 as the plug is screwed into the nipple and thus gives good metal-to-metal contact between threads 21 and threads 15.

A plate, designated generally as 23, having at least a central portion thereof spaced from the bottom of the plug illustrated as of substantially inverted U-shape having an outturned rim 24 in contact with the bottom of the plug is firmly attached to the plug. The attachment in the U-shaped plate illustrated is by means of upward projections 25 on the bottom of the plug fitting into openings 26 in the rim of the plate. The plug body and projections 25 preferably are formed by stamping a suitable plate of metal, thus forming the projections, or detents, 25 integral with the bottom of the plug. If desired the projections may be slightly nearer each other than the distance between the opposite openings 26 in the rim of the plate when the plate is unstressed, thus providing a pressure fit when attaching plate 23 to the bottom of the plug. Plate 23 has an opening through it in the central part spaced from the bottom of the plug. This opening has a central portion 27 which is circular and coaxial with the plug and has lateral extensions thereof illustrated as substantially rectangular extensions 28 which are preferably two in number and disposed diametrically opposite to each other.

A plurality of projections 29 are formed on the side of the plate facing the bottom of the body and are arranged in opposing pairs on opposite sides of each of the lateral extensions 28. These projections preferably are four in number and may be formed by pressing "dimples" 30 in the upper part of the plate when the plate is formed. These projections serve as a means for engaging a holder to rotate the plug.

The holder of this invention is of special construction designed to cooperate with the plate to rotate the plug into and out of position in the nipple. The holder, shown only in FIG. 3, has a cylindrical body 31 of diameter to fit into the circular central portion 27 of the opening through the plate. Body 31 has a laterally projecting shoulder 32 with lateral dimensions greater than the diameter of the circular portion 27 of the opening and preferably to fit easily into the hollow interior of the plug. The body also has a noncylindrical extension 33 adapted to fit into a socket in a handle 34. Extension 33 preferably has depressions 37 formed in its surface suitable to receive detents 36. The detents may be bolts or similar members passing through the handle, as illustrated, or spring pressed detents may be used when a snap-on type handle is desired. The handle may be of any type desired which is suitable to rotate the holder, such as a T-shaped handle or a handle having a U-shaped central portion of a common type used in carpenters' brace and bit boring devices. Body 31 carries a resilient member, preferably a spring and illustrated as a spring washer or Belleville spring 38, in position to contact the upper surface of plate 23 and to exert upward pressure on shoulder 32 when the holder is pressed down upon the plate. A crossbar 39 is also carried by body 31 in position just below the resilient member. The crossbar serves as a member for engaging projections 29 on the underside of the plate when the holder is inserted through the opening in the plate and rotated.

Operation of this apparatus is believed to be obvious from the above description. It is preferred to weld nipple 13 onto the pipeline before side opening 12 is cut therein by a suitable hot tapping device. Threads 16 on the outside of the nipple may serve to connect the nipple to a tapping valve during a tapping operation. After line 11 is tapped and plugged, a bypass line connected to nipple 13 through the tapping valve may be installed and a section of line 11 may be repaired. The bypass loop then can easily be removed and the nipple plugged without taking line 11 out of service, all according to methods well known in the art. This operation may be accomplished by closing a tapping valve attached to the nipple by threads 16 inserting plug 19 into a chamber above the tapping valve which may be sealed against pressure, inserting the holder into the plug and attaching a suitable handle to the holder with the handle extending through the wall of the sealed chamber in sealed relationship therewith.

While any sealed chamber suitable for attaching to a tapping valve and having an opening through a wall thereof suitable to receive a handle may be used with the apparatus of this invention if desired, I prefer to use a chamber constructed according to that shown in my copending patent application Serial No. 61,429, filed October 10, 1960. Chambers of this type have a seal surrounding an opening through a wall thereof permitting manipulation of a handle connected to a device inside the chamber without loss of fluid from the chamber. However, it is to be understood that the apparatus of the present invention may be used with or without a sealed chamber, and the present apparatus is effective for closing side openings in lines without regard to the presence of a sealed chamber attached to the nipple.

When the holder, plug and handle are assembled in a sealed chamber attached to a tapping valve carried by the nipple, the tapping valve is opened and the plug holder is manipulated by manual operation of the handle outside the chamber and the plug may be easily seated firmly in nipple 13. O-ring 18 seats on surface 17 of the nipple and forms a seal. During the operation of screwing the plug into the hole the holder rotates relative to the plug sufficiently for the crossbar 39 to engage projections 29 on the lower side of the plate and thus turns the plug. Spring 38 in its preferred form as a spring washer distributes pressure from the plug holder over a large upper portion of the plate surface and therefore permits the plate to be made of relatively thin material.

When the plug is firmly seated in nipple 13, the tapping valve may be removed; and if no further use is to be made of the opening 12 in pipeline 11, it is preferred that the nipple be capped by screwing a cap 40 onto the threads to prevent corrosion by contact with soil water or other corrosive medium.

It is obvious from the above description that the nipple 13 may be made very short and relatively light in weight. The preferred construction of the plug described above is also a very light piece of equipment, simple and easy to manufacture and low in cost to the consumer. The plate 23 may be made of light weight material, and the attachment of the plate to the plug is a very simple one.

The projections 25 in the bottom of the plate may be formed by pressing, and the openings 26 through the flange 24 of the plate may be so sized that there is a tight, press fit between the plate and these projections. This type of connection eliminates the necessity for a weld or for tapping the plug for insertion of machine screws or other attachments.

The plate 23 is of a type which is extremely simple and cheap to manufacture since it may be cut from a sheet of metal by a single operation. This advantage is illustrated best in FIG. 8 which shows the shape of a piece of metal to be cut out and folded to form the inverted U-shaped plate 23. A plate of this shape is stamped out in a single operation while the "dimples" 30 are pressed into it at the same time. The plate is then bent into inverted U-shape with an extending rim to fit the interior of the plug.

FIGS. 4 to 7 illustrate another embodiment of the invention in which a plug molded from a strong, slightly compressible plastic material is used. In this embodiment, the nipple 13a is of the same construction as nipple 13 of FIG. 1 with the exception that the inner threads 15a thereon have a slight inward taper, and the smooth, cylindrical surface 17 above threads 15 of FIG. 1 are omitted. Fluid-tight relationship between plug 23a and nipple 13a is obtained by cooperation of a cylindrical plug shown in FIG. 5 with the slightly tapered threaded bore of nipple 13a which cooperates to compress the plastic plug body slightly to make the seal.

A number of slightly resilient, strong plastic materials are available on the open market, and this invention is not limited to the use of any particular one of these materials. A preferred material of construction for plug 23a, however, is a plastic sold under the trade name of "Marlex" which has high strength, a slight degree of resilience and is unaffected by materials ordinarily transported in pipelines. The degree of taper of the threaded bore of nipple 13a will depend upon the compressibility of the plastic used, as will be readily apparent. The taper should be just sufficient to form a fluid-tight seal with the particular plastic material used.

Plug 23a is of cylindrical shape having a closed bottom and a hollow interior. The interior of plug 23a has arcuate shoulders 41 on the body disposed to support a flat plate 42, best shown in FIG. 6. Flat plate 42 extends across the body and is preferably stamped from a piece of metal in a single operation. This plate, like plate 23, has an opening therethrough comprising a substantially circular central portion 27a and lateral extensions 28a therefrom of size adapted to admit body 31 and crossbar 39 of the holder. Plate 42 also has "dimples" 30a pressed into its upper surface resulting in downward projections 29a on the underside of the plate serving as means for engaging the crossbar 39 of the holder when the holder is inserted through the opening and rotated slightly in either direction. The downward projections 29a are arranged in pairs on opposite sides of each of the lateral extensions 28a of the opening.

The arcuate shoulders 41 and a narrow shoulder 43 connecting shoulders 41 serve to support plate 42 in spaced relationship from the bottom of plug 23a, and the arcuate shoulders 41 also serve as points for attachment of the plate. Attachment to shoulders 41 is preferably made by a pair of self-tapping screws 44 inserted through openings in plate 42.

The operation using plug 23a is substantially the same as that described for closing the nipple 13 above. The principal difference lies in the fact that, when plug 23a is used, the fluid-tight seal is formed by cooperation with exterior surfaces of the threads 21a of this plug with the surfaces of tapered threads 15a. The slightly compressible nature of the plastic material used results in increase of pressure upon the lower threads 21a forcing them outward into sealing engagement with threads 15a as the plug is driven home. Thus, no O-ring or other type of seal is necessary, and no machined surface against which a resilient seal of the type illustrated in FIG. 1 may seal is necessary.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A plug for an internally threaded nipple having a cylindrical bore which comprises, in combination, an exteriorly threaded hollow cylindrical body having a closed bottom, a plate extending across the interior of the body with at least a central part of the plate spaced from the bottom of the body, an opening through said central part of the plate, said opening having a central portion and lateral extensions therefrom, an abutment beneath the plate positioned laterally from one side of one of said lateral extensions of said opening and adapted to engage a crossbar on a tool for turning the plug, and a downward projection on the underside of the plate facing the bottom of the body and positioned intermediate said abutment and said one side of said one of said lateral extensions of the opening.

2. A plug for a nipple having a cylindrical bore internally threaded near an end thereof which comprises, in combination, an exteriorly threaded hollow cylindrical metal body having a closed bottom, a ring of resilient material on the exterior of the body in position to seal against an internal surface of the nipple outward from said threads, a plate attached to the body extending across the interior of the body with at least a central part of the plate spaced from the bottom of the body, an opening through said central part of the plate, said opening having a central portion and diametrically opposite extensions therefrom, abutments beneath the plate on opposite sides of each of said extensions of the opening adapted to engage a crossbar on a tool for turning the plug, said abutments being positioned laterally from said extensions, and a plurality of downward projections on the central part of the plate facing the bottom of the body arranged in opposing pairs on opposite sides of each of said lateral extensions of the opening and intermediate such extensions and said abutments.

3. A plug for a nipple having a slightly tapered substantially cylindrical threaded bore which comprises, in combination, an exteriorly threaded hollow cylindrical body formed from slightly compressible plastic material and having a closed bottom, said cylindrical body and slightly tapered threaded bore of the plug being cooperative to form a fluid-tight seal, a plate extending across the interior of the body and spaced from the bottom of the body, an opening through the central part of the plate, said opening having a central portion and lateral extensions therefrom, diametrically opposite abutments on the interior of said body adapted to engage a crossbar on a tool for turning the plug, and a plurality of downward projections on the side of the plate facing the bottom of the body arranged on opposite sides of said lateral extensions of the opening intermediate such extensions and said abutments.

4. In apparatus for closing a pressurized pipe, that improvement which comprises a plug having a hollow substantially cylindrical body and a closed bottom; a plate attached to the plug and extending across the interior of the plug body with at least a part of the plate spaced from the bottom of the body; an elongated opening through said part of the plate, means below the plate for engaging a later-mentioned crossbar to rotate the plug; a downward projection on the underside of said part of the plate and positioned between said engaging means and an edge of said opening; and a plug holder having a body fitting into said opening; a crossbar carried by the plug holder body and having a portion engaging the underside of said part of said plate between said engaging means and said downward projection; and resilient means carried by the plug holder biasing the plug holder body in a direction away from the plug and urging the crossbar into engagement with the underside of said part of said plate as aforesaid; said crossbar being insertable through said opening with the plug holder body and then rotatable by the plug holder body into position between said engaging means and said downward projection.

5. The apparatus of claim 5 wherein there are a plurality of said downward projections on the underside of said part of said plate facing the bottom of the plug body and arranged in opposing pairs on opposite sides of said elongated opening; and wherein engaging means are opposing pairs of abutments arranged on opposite sides of said elongated opening.

References Cited in the file of this patent
UNITED STATES PATENTS

| | | |
|---|---|---|
| 2,483,964 | Bennett | Oct. 4, 1949 |
| 2,660,080 | De Kam | Nov. 24, 1953 |
| 2,675,142 | Spayd | Apr. 13, 1954 |
| 2,718,979 | Parish | Sept. 27, 1955 |
| 2,735,325 | Rudd | Feb. 21, 1956 |
| 2,737,205 | Stringfield | Mar. 6, 1956 |
| 2,745,304 | Corpelius | May 15, 1956 |
| 2,845,952 | Hill | Aug. 5, 1958 |